May 17, 1927.
T. R. BROWN
1,628,767
MACHINE FOR TESTING CAR WHEELS AND THE LIKE
Filed June 4, 1925
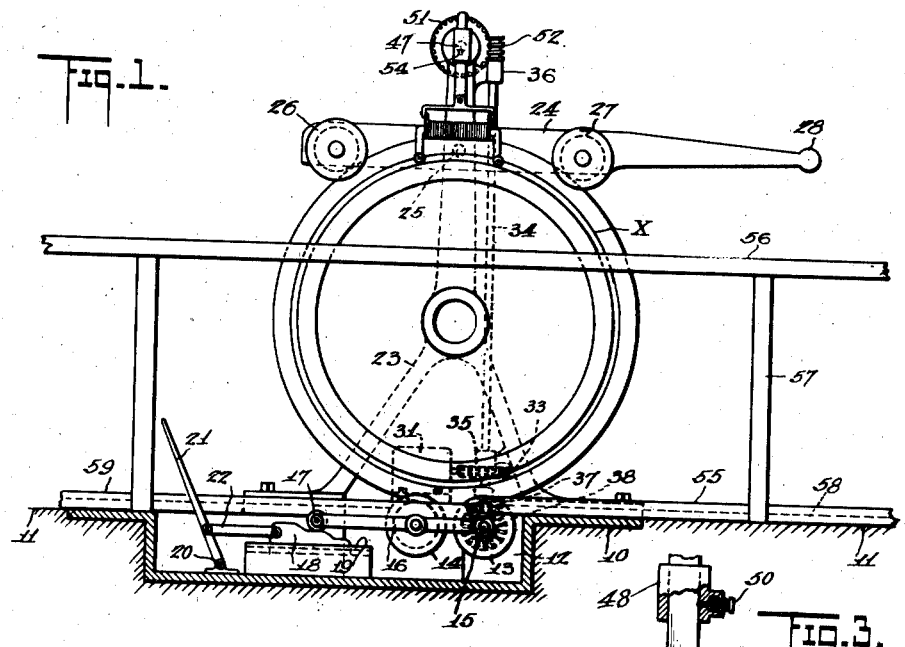
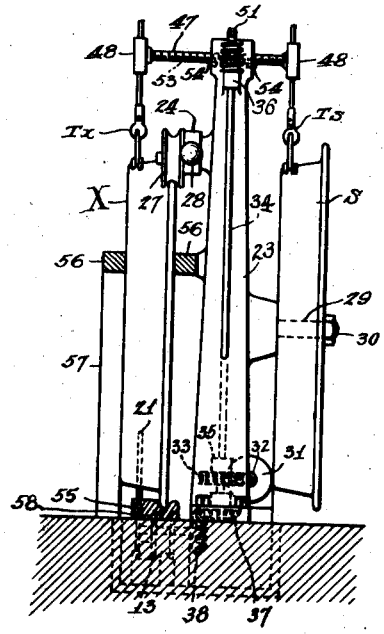
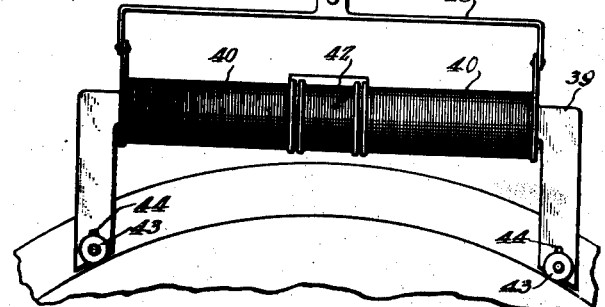
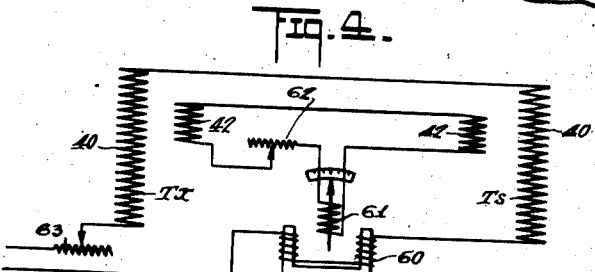
INVENTOR
*Thomas R. Brown,*
BY
*ATTORNEY*

Patented May 17, 1927.

1,628,767

UNITED STATES PATENT OFFICE.

THOMAS R. BROWN, OF JERSEY CITY, NEW JERSEY, ASSIGNOR TO BURROWS MAGNETIC EQUIPMENT CORPORATION, OF JERSEY CITY, NEW JERSEY, A CORPORATION OF DELAWARE.

MACHINE FOR TESTING CAR WHEELS AND THE LIKE.

Application filed June 4, 1925. Serial No. 34,888.

My invention relates to machines for testing car wheels and similar objects and has for its purpose to provide a machine in which a wheel may be compared to a standard.

A further purpose of my invention is to provide a machine in which certain physical characteristics of a wheel may be determined by comparing it magnetically with a standard in which said physical characteristics are known.

A more specific object of my invention is to provide a machine in which the hardness of a car wheel tread may be determined.

Another object of my invention is to provide means for readily introducing a car wheel into the machine for test and for readily discharging the car wheel from the machine after the test has been completed.

A further object is to provide means whereby a testing element is caused to traverse progressively the entire area of the surface to be tested.

With these and other objects in view, my invention consists in certain novel features of construction and combinations and arrangements of parts as will be more fully hereinafter described and pointed out in the claims.

Figure 1 shows a front elevation of my car wheel testing machine, partly broken away to show details;

Fig. 2 shows an end view of the machine as viewed from the inlet end thereof;

Fig. 3 shows an element of a magnetic testing apparatus employed on my machine; and Fig. 4 is a diagram of electric circuits of said magnetic testing apparatus.

My machine is provided with a base 10 preferably sunk flush with the floor or ground level 11, the floor being preferably higher at the inlet end of the machine than at the outlet end thereof, as clearly shown in Figure 1. The base 10 is formed with a pocket or pit 12 depressed below the floor 11. Mounted in the pit are two grooved wheels 13 and 14. The wheel 13 is secured upon a shaft 15. Fulcrumed on said shaft is a lever 16 on which the wheel 14 is journalled. The outer end of the lever 16 is provided with a roller 17 adapted to engage a cam 18 slidable in ways 19, supported on the floor of the pit 12. Fulcrumed at 20 in the pit 12 is a lever 21 which is connected by a link 22 with the cam 18. It will be observed that the cam is provided with three stepped faces so that by operating the lever 21 the wheel 14 may be moved to a high, low or intermediate position. Figure 1 shows the wheel 14 in its intermediate position.

Immediately above the pit 12 there is an upright or pedestal 23 which is bolted to the base 10. A lever 24 is fulcrumed on this pedestal at 25. Two grooved wheels 26 and 27 are mounted on said lever 24 at opposite sides of the fulcrum 25. The lever is provided with a handle 28 whereby it may be rocked on its fulcrum for a purpose which will be explained presently. The wheels 13, 14, 26 and 27 are adapted to engage the flange of a car wheel which is to be tested and which in the drawing is indicated by the letter X. A standard wheel S against which the wheel X is to be tested, is mounted upon the opposite side of the pedestal 23. The standard wheel does not need to be revolved during the testing operation but should preferably be held stationary. Accordingly, it is mounted upon a stud 29 projecting from the pedestal 23. A nut 30 serves to clamp the wheel in place.

The wheel X is adapted to be revolved on its own center by rotating the wheel 13. To rotate the wheel 13, a reversing motor 31 is provided which carries a worm 32 on its armature or rotor shaft. The worm 32 drives the worm wheel 33 secured to an upright shaft 34 mounted in bearings 35 and 36 carried by the pedestal 23. Power is transmitted from shaft 34 to shaft 15 by means of a pair of miter gears 37 and 38.

The testing apparatus includes two elements $T^x$ and $T^s$ which bear respectively on the tread surface of the wheels X and S. Said elements are alike and of the form shown in Fig. 3. Each element comprises a U-shaped core 39 of suitable magnetic material, such as soft iron, on which is wound a primary coil and a secondary coil. For purposes of convenience, the primary coil is divided into two sections 40, between which is located the secondary coil 42. At the ends of the core 39 are pairs of rollers 43 of non-magnetic material. The rollers 43 are adapted to roll on the surface of the car wheel tread and serve to insure a uniform air gap between the ends of the core and the tread surface. This air gap may be varied by adjusting the rollers 43 in the slots 44. The testing element is suspended in a yoke 45 which in turn is fulcrumed to the end of a vertical rod 46. The two magnetic testing elements are mechanically coupled together in the following manner: Rod 47 is mounted to slide in bearings in the upper end of the pedestal 23. At each end of this rod there is an upright sleeve 48 in which the rods 46 are adapted to slide. In order to hold the element $T^x$ out of the way when wheel X is being introduced into the machine, the rod 46 is formed with a notch 49 and a spring pressed pin 50 engages said notch when the testing device is moved upward in the sleeve 48. After wheel X has been introduced into the machine the pin 50 is withdrawn, whereupon the testing device will drop of its own weight upon the wheel, resting on the rollers 43.

The upper end of pedestal 23 is bifurcated to receive a worm wheel 51 which is driven by worm 52 on shaft 34. The rod 47 is threaded to engage the threaded bore of the worm wheel 51 so that as the shaft 34 revolves, the rod 47 will be fed slowly through the worm wheel. To prevent the rod 47 from turning with wheel 51, it is formed with a spline 53 which is engaged by keys 54 in the pedestal 23.

In operation the wheel to be tested is introduced into the machine as follows: First, testing element $T^s$ is raised out of the way and held by pin 50, the lever 21 is moved forward to raise wheel 14 to its highest position, and the lever 28 is swung upward to permit of rolling the wheel X into position for test. An incoming track 55 is provided on which the wheel may be rolled and it is guided laterally by rails 56 on either side suitably supported by uprights 57. The track 55 is formed with a groove 58 to receive the flange of the wheel. The groove 58 is alined with the groove in wheel 13, the track being cut away to clear the wheel 13. A part of the track on which the tread of the car wheel X rolls continues to a point above the center of wheel 13 and then bends downward and joins the outgoing track 59. The track 59 is also cut away to clear the wheel 14 and beyond said wheel is formed with a groove to receive the flange of the car wheel. The difference of level between tracks 55 and 59 is equal to the drop between the intermediate and low positions of the wheel 14. As the wheel X is rolled into the machine its progress is arrested by the wheels 14 and 26. Thereupon the lever 28 is lowered and the lever 21 is moved to bring wheel 16 to its intermediate position; whereupon wheel X rolls by gravity to the position indicated in Figure 1, resting upon wheels 13 and 14 and held at the top by wheels 26 and 27. The testing devise $T^x$ is now lowered by releasing the spring pressed pin 50. The machine is now ready for test. The motor is operated to revolve the wheel X slowly and at the same time move the testing devices slowly across the tread surface of wheels X and S. The result is a spiral progression of element $T^s$ relative to the tread surface of the wheel X while element $T^x$ progresses in an axial direction across the tread of the standard wheel S, and the tread of wheel X is thus magnetically compared with the tread of the standard wheel. After the test has been completed, the testing element $T^s$ is raised out of the way and lever 21 is operated to lower wheel 14, whereupon the wheel X will roll out on the track 59 and pass out of the machine. At the same time lever 28 may be depressed forcing wheel 27 against the flange of wheel X thereby giving it an impulse which will start it rolling along the outgoing track 59. The next wheel to be tested may then be rolled into the machine as described above and after the element $T^x$ has been lowered the motor is reversed to feed the testing elements in the opposite direction. If desired however, the motor may be operated to restore the testing elements to their original position after each test so that the wheels will always be tested in the same direction.

The electric circuits of the magnetic testing apparatus are illustrated in Fig. 4. It will be observed that the primary coils 40 of the two testing devices are connected in series to a source of alternating current. The secondary coils 42 of the two testing devices are connected in bucked relation. A dynamometer is provided, having the field coils 60 thereof in series with the primary coils 40 and the potential coil 61 in series with the secondary coils 42. A non-inductive variable resistance 62 is provided in series with the potential coil to vary the strength of the induced current passing through the dynamometer and a non-inductive variable resistance 63 is provided to vary the strength of the current passing through primary coils 40.

The operation of the testing apparatus is as follows:

When the primary coils are energized with variable or alternating current, a varying magnetic field is generated in the U-shaped core 39 and in that part of the standard or the test wheel embraced between the legs of the core. Maximum density of the field will be determined by the character of said part. For instance, the harder the metal of said part the less dense will be the field. An electric current will be induced in the secondary coil 42 and the maximum intensity of this current will be proportional to the maximum density of the field passing through the core. The secondary coils of the two testing elements are bucked, hence current passing through the potential coil 61 of the dynamometer will represent the differential of the two induced currents. The field coil of the dynamometer, however, is connected in series with the primary coils and consequently, the dynamometer will indicate the differential of the energy absorbed by the specimen and the standard. The sensitivity of the measurement can be varied by adjusting the strength of the energizing current and also by varying the strength of the induced current. As a car wheel tread is apt to vary magnetically between points near the flange and points near the outer edge of the car wheel, it is desirable that the two testing elements move simultaneously across corresponding parts of the tread surfaces of the two wheels.

It is important to maintain uniform air gaps between the ends of the cores 39 and the tread surfaces, for a slight variation in the air gaps will produce a difference in the maximum density of the magnetic field. It is for this reason that the rollers 43 are provided and are made adjustable in the legs of the cores. The testing elements rest by gravity on the tread surface and owing to the suspension of the testing element in the yoke 45 and the pivotal connection of the yoke with the vertical rod 46, a universal movement is provided which permits the element to seat properly upon the wheel surface and follow the contour of the tread.

I do not claim to have invented this magnetic testing apparatus but have described it in some detail in order to explain the purpose of certain parts of my machine. Neither do I confine my invention to the use of the particular testing apparatus described, for it will be evident that other forms of testing apparatus might be employed with my machine.

Numerous slight changes and alterations may be made in the general form and arrangement of the parts described without departing from the spirit of my invention, and hence I do not wish to limit myself to the precise details set forth, but shall consider myself at liberty to make such changes and alterations as fall fairly within the scope of the appended claims.

I claim:

1. A machine of the character described comprising a mounting for a specimen and a standard, a testing apparatus, means for effecting relative movement between the testing apparatus and the specimen and standard, and relative angular movement between the specimen and the apparatus.

2. A machine of the character described comprising a mounting for a specimen and a standard, a testing apparatus comprising two elements, one engaging the specimen and the other the standard, and means for effecting a relative spiral movement between the specimen and the elements in engagement therewith.

3. A machine of the character described comprising a mounting for a specimen and a standard, a testing apparatus comprising two elements, one engaging the specimen and the other the standard, and means for effecting a relative spiral movement between the specimen and the element in engagement therewith and a relative transverse movement between the standard and the other element.

4. A machine of the character described comprising a mounting for a specimen and a standard, a testing apparatus comprising two elements, one engaging the specimen and the other the standard, and means for moving the specimen in one direction relative to said elements, and simultaneously moving said elements in a direction transverse to the aforementioned direction of movement.

5. A machine of the character described comprising a mounting for a specimen and a standard, a testing apparatus comprising two elements, one engaging the specimen and the other the standard, means for revolving the specimen, and means for moving said elements in a direction transverse to the plane of rotation of the specimen.

6. A machine of the character described comprising a mounting for a specimen and a standard, a testing apparatus adapted to engage the specimen and the standard, and means for moving the testing apparatus in one direction and the specimen in another direction.

7. A machine of the character described comprising a mounting for a specimen and a standard, a testing apparatus adapted to engage the specimen and the standard, and means for moving the specimen relative to said apparatus and simultaneously moving the apparatus relative to the standard.

8. A machine of the character described comprising a mounting for a specimen to be tested and for a standard, a testing apparatus comprising two elements, one engaging the specimen and the other the standard, and means for effecting relative movement of the specimen in one direction and of said elements in another direction, said movements being in timed relation.

9. A machine of the character described comprising a mounting for a specimen to be tested and for a standard, a pair of testing elements adapted to engage the specimen and standard respectively, and a coupling member adapted to couple the elements together, each member being freely slidable vertically within the coupling member.

10. A machine of the character described comprising a mounting for a specimen to be tested and for a standard, a pair of testing elements adapted to engage the specimen and the standard respectively, a coupling member adapted to couple the elements together, each member being freely slidable vertically within the coupling member, and means for holding one of the elements in elevated position.

11. A machine of the character described comprising a mounting for a specimen and a standard, a pair of testing elements adapted to engage the standard and the specimen respectively, a coupling member, a pair of rods freely slidable in said member, and universal joints connecting the rods with the testing elements respectively.

12. In a machine for testing car wheels, an incoming track and an outgoing track on which the wheel to be tested may be rolled into and out of the machine respectively, two rollers adapted to support the wheel in the machine, and means for moving one of said rollers in one direction to check the advance of the wheel as it enters the machine and in another direction to permit exit of the wheel from the machine.

13. In a machine for testing car wheels, an incoming track and an outgoing track on which the wheel to be tested may be rolled into and out of the machine respectively, a plurality of rollers adapted to support the wheel in the machine, means for rotating one of the rollers to revolve the wheel, and means for moving another of the rollers to one position for checking the advance of the wheel as it rolls into the machine, to a second position for holding the wheel in the machine and to a third position for permitting access of the wheel to the outgoing track.

14. In a machine for testing car wheels, an incoming track, an outgoing track at a lower level than the incoming track, a pair of rollers comprising a driver and an idler located between said tracks and adapted to support the wheel to be tested, means for rotating the driver to revolve the wheel by friction, and means operable to elevate the idler to check the advance of the wheel as it is rolled along the incoming track into the machine, to lower the idler to an intermediate position to center the wheel in the machine and further to lower the idler to a level with the outgoing track to permit the wheel to roll out upon said outgoing track.

15. In a machine for testing car wheels, an incoming and outgoing track upon which the wheel to be tested may be rolled into and out of the machine respectively, a pair of rollers between and alined with said tracks and adapted to support the wheel in the machine, means for rotating one of the rollers to revolve the wheel by frictional engagement therewith, a third roller adapted to engage the upper part of the wheel, and means for elevating said third roller to permit entrance of the wheel into the machine and lowering said third roller to force the wheel out of the machine.

16. In a machine for testing car wheels, an incoming track, an outgoing track on a lower level than the incoming track, a plurality of rollers adapted to support the wheel, one roller constituting a driver and the others serving as idlers, means for rotating the driver to revolve the wheel by friction, and means for adjusting the idlers to control entrance of the wheel into the machine and exit of the wheel from the machine.

17. In a machine for testing car wheels, an incoming track, an outgoing track, a pair of rollers between and alined with said tracks for supporting the wheel to be tested, a lever at the top of the machine, idler rollers mounted on the lever on opposite sides of the fulcrum thereof, said idlers being adapted to engage the upper part of the wheel, and means for oscillating said lever.

THOMAS R. BROWN.